United States Patent [19]

Panaritis et al.

[11] 4,056,026
[45] Nov. 1, 1977

[54] APPARATUS FOR CUTTING MEAT

[75] Inventors: Dimitrios P. Panaritis; Spyros A. Iacovidis, both of Thessaloniki, Greece

[73] Assignees: Georges P. Panaritis; Panayotis P. Panaritis, both of North Bay, Canada

[21] Appl. No.: 727,537

[22] Filed: Sept. 28, 1976

[30] Foreign Application Priority Data

Oct. 1, 1975 Greece .................................. 53287

[51] Int. Cl.² .............................................. B26D 3/24
[52] U.S. Cl. ........................................ 83/454; 83/762; 269/87.2; 269/295
[58] Field of Search ................................ 83/762–767, 83/454, 455; 269/87.2, 295; 30/124

[56] References Cited

U.S. PATENT DOCUMENTS 2,679,274  5/1954  Criner ..................................... 83/762
3,452,795  7/1969  Davies ..................................... 83/762

*Primary Examiner*—J. M. Meister
*Attorney, Agent, or Firm*—Cushman, Darby & Cushman

[57] ABSTRACT

A device for cutting slices of meat into a plurality of meat chunk stacks on skewers. The device comprises a container whose vertical walls are provided with guide slots for a knife blade. The container is arranged to receive a stack of meat slices slightly compressed by a top plate whose bottom face has a plurality of guide grooves for facilitating the initial insertion of the knife edge into the stack. A plurality of openings is provided in the top plate and in the bottom plate for guiding skewers to be inserted through the stack of meat either prior or after the cutting into small chunks of the entire content of the container. The device facilitates preparation of dishes of the type of shish kebab, souvlaki or the like.

7 Claims, 4 Drawing Figures

APPARATUS FOR CUTTING MEAT

The present invention relates to a device for guiding a knife to facilitate uniform cutting of meat slices into a plurality of stacks. In particular, the invention relates to an apparatus for commercial preparation of dishes of the type including small chunks of meat placed on skewers, such as "souvlaki" or shish kebab.

The above type of dish is normally prepared by first providing slices of meat and then cutting the slices into small chunks which are eventually placed on skewers, ready for further processing by broiling or the like.

One of the important aspects of commercial preparation of the above type of dishes is that individual dishes should have as a uniform overall weight as possible. This requires a skill in cutting the chunks of meat and in their placing on the skewers.

It is an object of the present invention to provide a simple apparatus wherein the operation of cutting of chunks of meat and placing same on the skewers in considerably facilitated to both reduce the required skill and speed up the overall operation, at the same time facilitating the storage of the dishes ready for the broiling or the like.

According to the invention, a device is provided for guiding a knife to facilitate uniform cutting of a stack including meat slices into a plurality of stacks each including meat chunks of generally uniform size. The device comprises a generally rectangular container structure including a bottom and four generally upright walls for receiving said stack. A plurality of vertical slots is provided in each of said walls. The slots are equidistantly spaced from each other whereby the slots form a plurality of pairs of slots. Each pair of slots is located in a generally vertical plane disposed at a right angle with respect to the walls in which the slots of said pair are disposed. Each of the slots extends over a substantial portion of the height of the respective wall. Thus, the blade of a knife can be inserted to pass through both slots of each of said pairs and to be guided by same along the respective generally vertical plane, as it cuts through said stack.

The invention thus provides an apparatus for commercial preparation of a plurality of dishes of the type including small chunks of meat placed on skewers, the apparatus including a generally rectangular container means having side wall means and bottom means. Coupling means are provided for releasably securing the side wall means and the bottom means to each other. A compressing plate means having a top face and a bottom face and peripheral edges is arranged to be received within the container and to be urged towards the bottom means. A plurality of vertical slots extends substantially the entire height of each wall of said wall means, the slots being arranged at an equidistant spacing from each other. The bottom face of said plate means is provided with longitudinal and transverse grooves extending the entire length and width thereof and equidistantly spaced from each other. The spacing between the grooves corresponds to that of the vertical slots such that, on placing of the plate means into the container, each of said grooves extends between a respective pair of the slots of mutually opposite walls. Thus, each of said grooves and the associated pair of slots form guide means for guiding a knife blade.

The invention will now be described in greater detail by way of a preferred embodiment shown in the accompanying drawings wherein.

Figure 1:
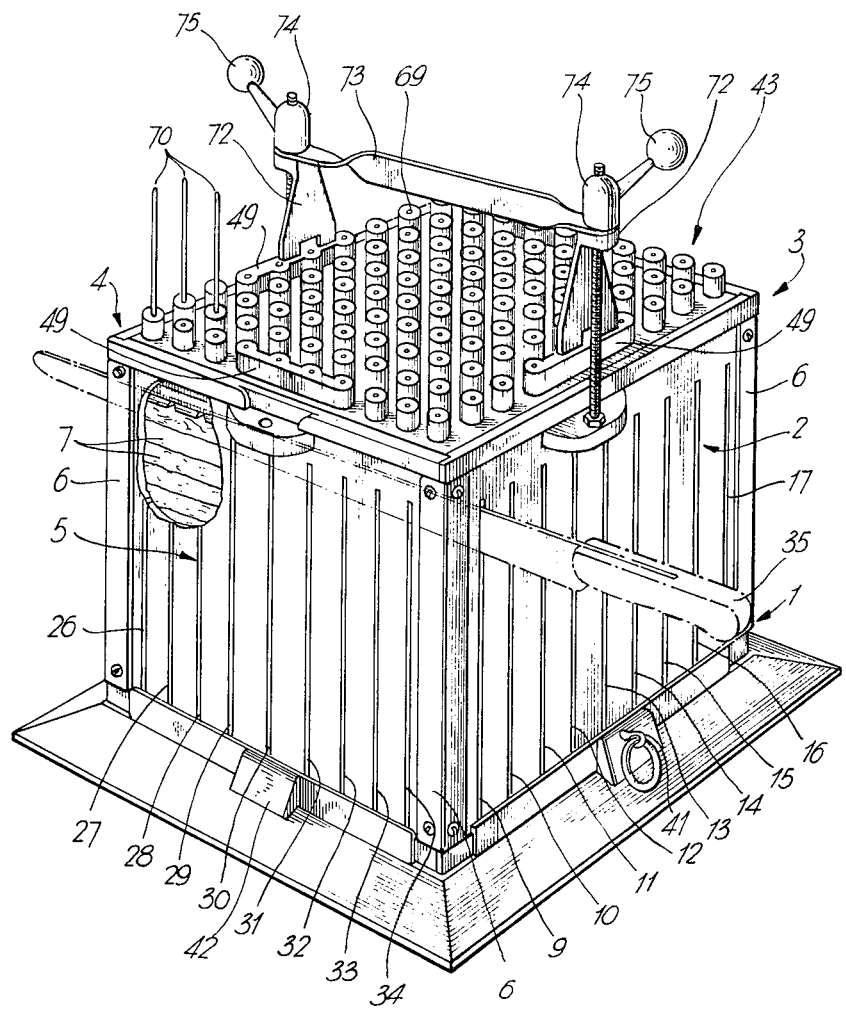
FIG. 1 is a perspective view of the apparatus in operation, partly cut out to display the slices of meat located therein.

Turning now particularly to FIG. 1, it will be seen that the device comprises a generally rectangular container structure which, in general terms, comprises a bottom 1 and four generally upright walls 2, 3, 4 and 5. The walls 2, 3, 4, 5 form a compact unit, held together by corner angles 6. As best seen from FIG. 1, the container formed by bottom 1 and side walls 2, 3, 4 and 5 is arranged to receive a stack of meat slices 7 therein.

Figure 2:
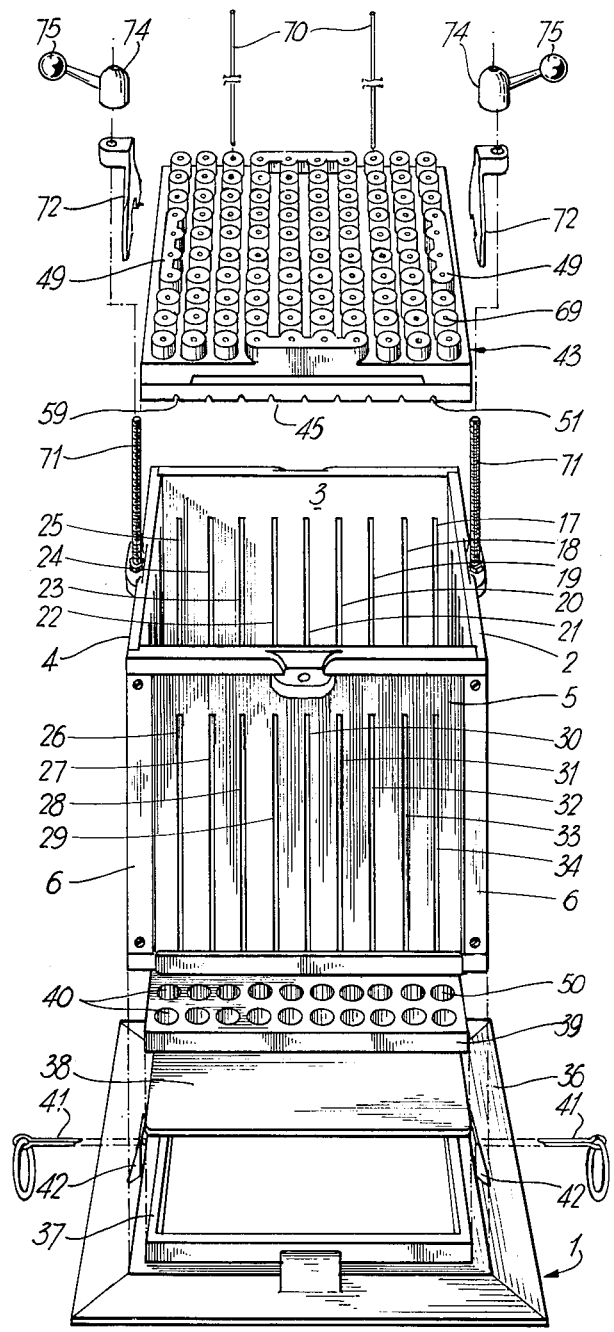
FIG. 2 is an exploded perspective view of the apparatus as shown in FIG. 1.

A plurality of vertical slots 9 – 34 is provided in each of the walls 2, 3, 4 and 5, the reference numerals 9 – 34 being only used to designate the slots of walls 2, 3 and 5, it being understood that the wall 4 has slots disposed substantially in the same manner as those of wall 2. The slots are equidistantly spaced from each other. In other words, the distance of e.g. slots 26 – 27 is the same as the distance between slots 24 and 23 and corresponds, in turn, to the spacing of any of two adjacent slots in any of the walls. With reference to FIG. 2, therefore, it will be appreciated that the slots form a plurality of pairs of slots 17 – 34; 18 – 33; 19 – 32; 20 – 31; 21 – 30 etc., each of the pairs of slots being located in a generally vertical plane disposed at a right angle with respect to the walls in which the slots of said pair are disposed. For instance, it will be appreciated that slots 25 and 26 are located in a common vertical plane which is perpendicular to both the front wall 5 and the rear wall 3 in which the respective slots are located. It is also apparent from FIG. 1 and FIG. 2 that each of the slots 9 – 34 extend over a substantial portion of the overall height of the respective wall 2, 3, 4 and 5. Thus, as shown in FIG. 1, a blade 35 of a knife can be inserted to pass through any of the pair of slots generally as shown in FIG. 1 and to be guided by same along the respective vertical plane as it cuts through the stack of slices 7.

As best seen from FIG. 2, the bottom 1 is formed by as assembly of a heavy base or frame 36 having an upright peripheral protrusion 37 whose outside contour generally corresponds to the contour of a solid bottom plate 38 which, in turn, supports a bottom wall 39 provided with a plurality of openings 40. The peripheral contour of the bottom wall 39 and of the bottom plate 38 is such as to allow the receiving of the two plates inside the upright wall assembly of walls 2 – 5. The upright walls 2 and 4 are provided at the bottom part thereof with openings (not shown) for receiving locking pins 41 arranged to pass through respective bosses 42 formed in the frame 36. Thus, the pins 41 are capable of locking the assembly of walls 2 – 5 firmly to the base elements as referred to above. The pins 41 and their associated portions may generally be referred to as coupling means for releasably securing said side wall means and said bottom means with each other.

The device further comprises a compressing plate 43, also referred to as a rectangular guide plate 43. As best seen from FIGS. 3 and 4, the plate 43 has a top face 44 and a bottom face 45. The plate 43 is of a rectangular plan including a front edge 45, a rear edge 46 and two side edges 47, 48. The dimensions of the plate defined by edges 45 – 48 is such that the plate 43 can be received within the inside clearance of the upright walls 2 – 5, as viewed in top view. In other words, the perimeter of plate 43 generally corresponds to but is slightly less than the plan of the inside of the container.

The top face face 44 of plate 43 includes bosses 49 which form a part of an arrangement urging the plate toward the bottom of the container, as described in greater detail hereinafter.

The bottom face 45 of plate 43 is provided with a plurality of longitudinal grooves 51 – 59 and with a plurality of transverse grooves 60 – 68. As best seen from FIG. 3, each of the grooves 51 – 59 extends the entire length of plate 43 while each of the grooves 60 – 68 extends the entire width thereof. The grooves 51 – 68 are equidistantly spaced from each other, the spacing between adjacent grooves corresponding to that of the vertical slots 9 – 34, as referred to hereinabove. In other words, e.g. the spacing between grooves 66 and 67 corresponds to the spacing between grooves 10 – 11, the spacing between grooves 52 – 51 corresponding to that of slots 33 – 34 or 18 – 17. Consequently, when plate 43 is placed in container defined by walls 2 – 5, each of said grooves extends between a respective pair of said slots of mutually opposite walls. For instance, the groove 53 (FIG. 4) is capable of guiding the blade 35 of the knife between slots 32 and 19. Each of the grooves thus forms, together with the associated pair of slots, guide means for the knife blade 35.

Figure 4:
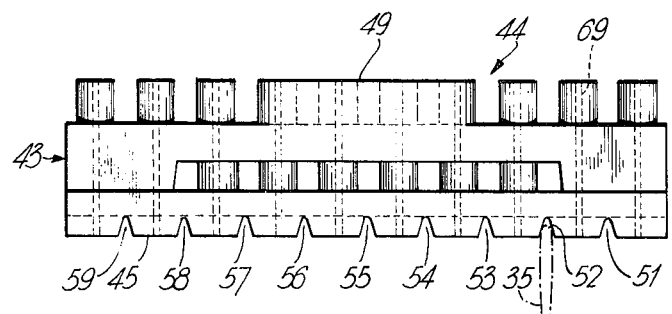
FIG. 4 is a side view of the plate of FIG. 3.
Figure 3:
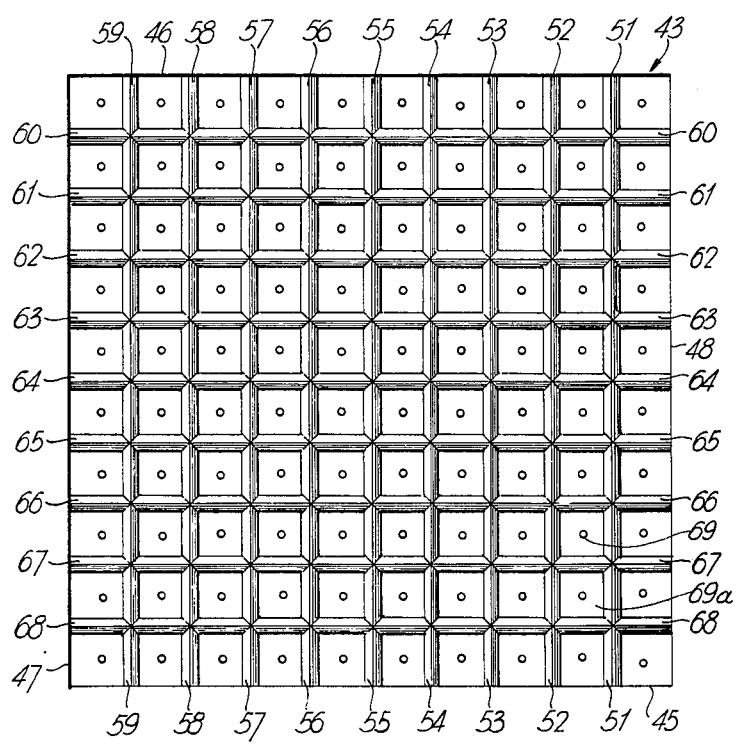
FIG. 3 is a bottom view of a guide plate for use in the present invention.

The grooves 51 – 68 divide the overall area of the bottom of plate 43 (FIG. 3) into a plurality of longitudinally and transversely arranged small rectangular areas such as area 69a, each of which is provided with a generally, centrally located passage, only one passage namely passage 69 of the area 69a limited by grooves 51, 52, 67 and 68 being referred to in FIG. 3, for the sake of clarity. FIG. 4 shows that the passages extend generally perpendicularly to the bottom face 45 of the plate 43. The mutual spacing between the passages is, again, equidistant and corresponds to the spacing of slots in upright walls 2 – 5. It also corresponds to the spacing and pattern of the openings 40 provided in the bottom wall 39. When the plate 43 is inserted into the container (FIG. 1) it will be appreciated that the openings 39 in the top plate 43 form with the respective openings 40 of the bottom wall 39 a plurality of pairs of coaxial openings. One such pair of openings is formed by opening 69 as marked in FIG. 2 and an opening 50 in the bottom wall 39 it being understood that the opening 50 actually belongs to the system of openings 40 as referred to.

The size of the openings 40, 50 in the bottom wall 39 is greater than that of passages 69 in the top plate 43. The size of openings 69 is slightly in excess of diameter of skewers 70 (FIG. 1). Consequently, it will be appreciated that on placing the top plate 43 into the container defined by walls 2 – 5, skewers 70 can be passed through the stack of slices 7 either before or after the cutting of knife blade 35.

Apart from the above mentioned means for releasably securing the bottom 1 to the walls 2 – 5, which includes pins 41 and their associated parts, the device further includes means for urging the guide plate 43 generally vertically downwardly towards the bottom to slightly compress the stack of slices 7 located in the container. Such means include two vertical screws 71 fixedly secured to the central top edge of walls 2 and 4, as best seen in FIGS. 1 and 2. The screws slidably receive pressure plates 72 whose bottom edges engage the top face of the respective bosses 49 as best shown in FIG. 1. A transverse beam member 73 (not shown in FIG. 2) extends between the screws 71 and forms a centering element thereof. The selective compression is exerted by nuts 74 provided with suitable handles 75.

In operation, relatively large slices 7 of meat are first placed into the container releasably secured to the bottom 1 as described above. Subsequently, the top plate 43 is placed on top of the stack of slices 7 whereupon skewers 70 are inserted through all of the openings 69, 40, 50, respectively. Before or after the insertion of skewers 70, the stack is slightly compressed by operating nuts 74 to slightly compress the entire stack. The blade 35 of a knife can then be inserted into the container such that it is first inserted through one slot (e.g. slot 9 as shown in FIG. 1), then, with the blade urged against groove 68, the blade passes through the slot in the opposite wall 4 until the position as shown in FIG. 1 is reached. The entire stack can now be easily cut by moving the blade 35 downwards until the bottom wall 39 (which is made of wood or another suitable material to prevent undue damage to the cutting edge of blade 35) is reached. The knife is then removed from the container and inserted in adjacent slot 10 to be guided by groove 67 and subsequently by slot 10 and its associated slot in the opposite wall 4. The operation is repeated until the entire stack has been cut as desired. The coupling pins 41 are then removed to enable removal of the entire assembly of walls 2 – 5 from the stack of precut dishes which can then be either placed in a refrigerator or used immediately for broiling etc. It will be appreciated that the removal of the top plate does not pose any problem. At the same time, it will be appreciated that the bottom tips of each of the skewers 70 have reached the area of openings 40, 50 in the bottom wall 39.

Thus, the present invention provides a simple, relatively inexpensive and efficient tool for restaurants and similar commercial outfits, the device reducing the skill requirements and, at the same time, increasing the speed of preparation of the above type of dishes.

Those skilled in the art will readily appreciate many modifications which may differ from the above embodiment. For instance, the arrangement of the walls 2 – 5 may be of a completely knock-down type such that each of the walls would be releasably secured to its adjacent walls. The selective compression of the top plate 43 can also be effective by means different from those shown. These and many other modifications of the embodiment as described above, however, do not depart from the scope of the present invention as defined in the accompanying claims.

The embodiments of the invention in which an exclusive property or privilege is claimed are defined as follows:

1. In a device for guiding a knife to facilitate uniform cutting of a stack including meat slices into a plurality of stacks including meat chunks of generally uniform size, the device comprising a generally rectangular container structure including a bottom and four generally upright walls for receiving said stack; a plurality of vertical slots in each of said walls, said slots being equidistantly spaced from each other whereby said slots form a plurality of pairs of slots, each pair of slots being located in a generally vertical plane disposed at a right angle with respect to the walls in which the slots of said pair are disposed, each of said slots extending over a substantial portion of the height of the respective wall; whereby the blade of a knife can be inserted to pass through both slots of each of said pairs and to be guided by same along the respective generally vertical plane as it cuts through said stack; the improvement comprising a rectangular guide plate whose perimeter generally corresponds to but is slightly less than the plan of the inside of said container; said guide plate having a bottom face provided with a plurality of straight, transversely and longitudinally disposed guide grooves equidistantly spaced from each other at a spacing corresponding to the spacing of said slots to render each of said grooves generally coincident with the respective generally vertical plane when said plate is inserted into the container.

2. A device as claimed in claim 1 wherein said grooves divide the bottom face into a plurality of longitudinally and transversely arranged small rectangular areas; each of said areas having a passage through the plate extending generally perpendicularly to the bottom of said plate, generally centrally of the respective rectangular area.

3. A device as claimed in claim 2, wherein said bottom of the container includes a plurality of openings, the axis of said openings being disposed at the same spacing and pattern as the spacing and pattern of the openings in said guide plate, whereby the openings in said plate and the openings in said bottom form a plurality of longitudinal and transverse rows of pairs of generally coaxial openings on inserting the plate into the container.

4. A device as claimed in claim 2 wherein the size of the openings in said bottom is greater than that of the passages in said plate.

5. A device as claimed in claim 2, further comprising means for releasably securing said bottom to said walls.

6. A device as claimed in claim 4, further comprising means for urging said guide plate generally vertically downwardly towards said bottom, to compress the stack of slices located in said container.

7. Apparatus for commercial preparation of a plurality of dishes of the type including small chunks of meat placed on skewers, said apparatus comprising, in combination;
   a. generally rectangular container means having side wall means and bottom means;
   b. coupling means for releasably securing said side wall means and said bottom means to each other.
   c. compressing plate means having a top face and a bottom face and peripheral edges arranged to be received within said container and to be urged towards the bottom means;
   d. a plurality of vertical slots extending substantially the entire height of each wall of said wall means and arranged at an equidistant spacing from each other;
   e. said bottom face of said plate means being provided with longitudinal and transverse grooves extending the entire length and width thereof and equidistantly spaced from each other, the spacing between said grooves corresponding to that of said vertical slots such that, on placing of said plate means into said container, each of said grooves extends between a respective pair of said slots of mutually opposite walls; whereby each of said grooves and the associated pair of slots form guide means for guiding a knife blade.

* * * * *